US012746864B2

(12) United States Patent
Long

(10) Patent No.: US 12,746,864 B2
(45) Date of Patent: Sep. 29, 2026

(54) CAR SIDE HEADREST CONNECTION STRUCTURE AND SIDE HEADRESTS

(71) Applicant: Qinglv Long, Dongguan City (CN)

(72) Inventor: Qinglv Long, Dongguan City (CN)

( * ) Notice: Subject to any disclaimer, the term of this patent is extended or adjusted under 35 U.S.C. 154(b) by 88 days.

(21) Appl. No.: 18/986,735

(22) Filed: Dec. 19, 2024

(65) Prior Publication Data

US 2026/0109280 A1 Apr. 23, 2026

(30) Foreign Application Priority Data

Oct. 18, 2024 (CN) ......................... 202422517611.5

(51) Int. Cl.
*B60N 2/882* (2018.01)
*B60N 2/885* (2018.01)
*B60N 2/80* (2018.01)

(52) U.S. Cl.
CPC ............. *B60N 2/882* (2018.02); *B60N 2/885* (2018.02); *B60N 2002/899* (2018.02)

(58) Field of Classification Search
CPC ................................ B60N 2/882; B60N 2/885
See application file for complete search history.

(56) References Cited

U.S. PATENT DOCUMENTS 5,868,471 A * 2/1999 Graham ................. B60N 2/882 5/640
5,967,613 A * 10/1999 McKeever ............... A61G 5/12 297/406
7,207,630 B1 * 4/2007 Reynolds ............. A61G 5/1054 297/400
8,888,187 B2 * 11/2014 Albino .................. B60N 2/885 297/400
9,575,503 B2 * 2/2017 Josten ....................... A61F 4/00
9,701,231 B2 * 7/2017 Arriola .................. B60N 2/882
10,118,526 B1 * 11/2018 Fan ........................ B60N 2/882
10,618,442 B2 * 4/2020 Zhou ...................... B60N 2/853
10,800,307 B1 * 10/2020 Zhou ........................ B60N 2/99
11,008,106 B2 * 5/2021 Parrilla Calle ........ B60N 2/888
11,225,180 B2 * 1/2022 Wang ....................... A47G 9/08
11,618,362 B1 * 4/2023 Yang ...................... B60N 2/838 296/1.07

(Continued)

FOREIGN PATENT DOCUMENTS

CN 110001488 A * 7/2019 ............. B60N 2/885
CN 111497711 A * 8/2020 ........... A47G 9/1045

(Continued)

*Primary Examiner* — Timothy J Brindley

(57) ABSTRACT

Disclosed is a car side headrest connection structure and side headrests, and the connection structure includes side headrests, further including a base, where two hook assemblies that can be moved horizontally are arranged on the base, and the hook assemblies are provided with U-shaped clamping openings; an end portion of the base is provided with sliding rods, and the sliding rods are arranged in the base in an inserted manner, and are capable of sliding horizontally in a damped manner; and one end of either of the sliding rods located on an outer side of the base is connected to a rotating element, and the rotating element is connected to the sliding rod for damping rotation, and the side headrest is detachably connected to the rotating element in an inserted manner.

10 Claims, 10 Drawing Sheets

(56) References Cited

U.S. PATENT DOCUMENTS

| | | | | |
|---|---|---|---|---|
| 11,648,860 | B2 * | 5/2023 | Zhou | B60N 2/897 297/404 |
| 12,427,900 | B2 * | 9/2025 | Zhou | B60N 2/885 |
| 2013/0068809 | A1 * | 3/2013 | Wang | B60R 11/02 224/275 |
| 2023/0019792 | A1 * | 1/2023 | Wang | B60N 2/818 |

FOREIGN PATENT DOCUMENTS

| | | | | | |
|---|---|---|---|---|---|
| CN | 212195197 | U | * | 12/2020 | B60N 2/882 |
| CN | 112977215 | A | * | 6/2021 | B60N 2/806 |
| CN | 218085195 | U | * | 12/2022 | B60N 2/2851 |
| CN | 119567984 | A | * | 3/2025 | B60N 2/841 |
| CN | 120716552 | A | * | 9/2025 | B60N 2/894 |
| DE | 10261229 | A1 | * | 7/2004 | B60N 2/2851 |
| DE | 102007039063 | A1 | * | 2/2009 | B60N 2/885 |
| KR | 102000947 | B1 | * | 7/2019 | B60N 2/882 |

* cited by examiner

CAR SIDE HEADREST CONNECTION STRUCTURE AND SIDE HEADRESTS

CROSS REFERENCE TO RELATED APPLICATIONS

The present application claims the priority of Chinese patent application No. 202422517611.5, filed on Oct. 18, 2024, and contents of which are incorporated herein by reference.

TECHNICAL FIELD

The present disclosure relates to the technical field of side headrests of car seats, and particularly relates to a car side headrest connection structure and side headrests.

BACKGROUND

In order to increase comfort inside cars, car owners usually equip their car seats with headrests. Car headrests currently on the market have various structural forms, and some of the car headrests further include side headrests for drivers and passengers to support their heads, which further improves their comfort.

In the prior art, a Chinese invention patent (ZL202322383241.6) discloses a car safety belt auxiliary device for children and a car seat headrest, including a fixing assembly for fixing the auxiliary device on a car seat and side headrests for supporting heads, and further including a limiting structure, where the limiting structure is arranged at a bottom of the side headrest of the car seat headrest, the limiting structure is configured for cooperating with the car safety belt and changing a stretching trajectory of the car safety belt, and the limiting structure is located below an initial stretching trajectory of the car safety belt.

The car seat headrest provided in the above patent is provided with the fixing assembly for fixing the auxiliary device on the car seat, the fixing assembly is provided with two U-shaped clamping openings, and the two U-shaped clamping openings are configured for clamping two insertion rods of the built-in car seat headrest. However, a distance between the two U-shaped clamping openings is fixed and not adjustable, thereby resulting in poor applicability and requiring further improvement.

SUMMARY

An objective of the present disclosure is to provide a car side headrest connection structure and side headrests, so as to solve the problem of poor applicability caused by an unadjustable distance between two U-shaped clamping openings on a fixing assembly of a headrest of a car seat in the prior art.

The present disclosure is implemented as follows: a car side headrest connection structure and side headrests, including side headrests, further including a base, where two hook assemblies that can be moved horizontally are arranged on the base, and the hook assemblies are provided with U-shaped clamping openings; an end portion of the base is provided with sliding rods, and the sliding rods are arranged in the base in an inserted manner, and are capable of sliding horizontally in a damped manner; and one end of either of the sliding rods located on an outer side of the base is connected to a rotating element, and the rotating element is connected to the sliding rod for damping rotation, and the side headrest is detachably connected to the rotating element in an inserted manner.

Further, either of the hook assemblies includes a housing base, and the housing base is provided with a U-shaped clamping opening; the housing base is provided with a first spring and a button body, where the button body is provided with a button rod and a first tooth, and the housing base is provided with a first through hole for the button rod to penetrate through and a second through hole for the first tooth to penetrate through; a sliding groove is formed inside the base in a length direction, a second tooth that fits the first tooth is formed on a sidewall of the sliding groove, the housing base is slidably arranged in the sliding groove of the base, and under the action of the first spring, the first tooth presses against the second tooth; and either of the hook assemblies further includes a hook, and the hook is hinged on the housing base.

Further, a plurality of snapping holes are formed horizontally on the base, and the base opposite to the plurality of snapping holes is horizontally provided with a track hole; and the sliding rod is provided with a mounting cavity, and the sliding rod further includes a snap-fit table, a fifth spring, a limiting block, and a mounting cavity cover installed inside the mounting cavity, the limiting block is arranged at a bottom of the mounting cavity, and the fifth spring is arranged between the snap-fit table and the limiting block, which provides elastic support for the snap-fit table; the mounting cavity cover is arranged above the snap-fit table, a top of the snap-fit table is an arc-shaped or hemispherical structure, the top of the snap-fit table penetrates through the mounting cavity cover and extends into the snapping hole, and the limiting block penetrates through the bottom of the mounting cavity and extends into the track hole.

Further, the sliding rod is provided with a first tooth pattern in a length direction, and the base is provided with a damping element and a second spring, where the damping element is provided with a second tooth pattern that matches the first tooth pattern, and when the sliding rods are inserted into the base, the second tooth pattern, under the action of the second springs, presses against the first tooth pattern.

Further, two protruding rod structures are arranged on one side of the damping element that is opposite to the second tooth pattern in a length direction of the damping element, the number of the second springs is the same as the number of the protruding rod structures, and the second springs are sleeved on the protruding rod structures in one-to-one correspondence.

Further, a plurality of guiding holes are formed in the damping element in a length direction, the base is provided with guiding columns that are in one-to-one correspondence with the guiding holes, and the guiding columns penetrate through the guiding holes in one-to-one correspondence; and the base is further provided with spring grooves in one-to-one correspondence with the second springs, and the second springs are arranged in the spring grooves in one-to-one correspondence.

Further, a mounting groove is formed at one end of either of the sliding rods located on the outer side of the base, damping tables and third springs are arranged in the mounting groove, either of the damping tables is provided with an arc-shaped protrusion, and a through hole for the arc-shaped protrusion to penetrate through is formed in a wall of the mounting groove; either of the rotating elements is provided with a circular tube-like adapter sleeve, and a plurality of snap-fit grooves that are fitted with the arc-shaped protrusion are uniformly formed on an inner wall of the adapter sleeve along its circumference; and one end of either of the sliding rods located on the outer side of the base is inserted into the adapter sleeve, and under the action of the third spring, the arc-shaped protrusion of the damping table presses against the inner wall of the adapter sleeve.

Further, two damping tables and two third springs are arranged in the mounting groove, each of the damping tables includes a support, an arc-shaped protrusion is arranged in a middle of the support, a positioning rod is arranged at either end of the support, and both ends of the corresponding third spring are sleeved on the two positioning rods on a same side of the two damping tables.

Further, either of the rotating elements is provided with an insertion rod, the insertion rod is hollow, and the insertion rod is provided with a fourth spring and a pressing key; and either of the side headrests is provided with a sleeve tube, the insertion rod is inserted into the sleeve tube, and the sleeve tube is provided with a pressing hole; a wall of the insertion rod is provided with a through hole that is communicated with the hollow structure thereof, and under the action of the fourth spring, an outer end of the pressing key penetrates through the through hole, and is inserted into the pressing hole of the sleeve tube.

Further, both an inner wall of the insertion rod and an inner wall of the pressing key are provided with groove structures, and both ends of the fourth spring are located in the groove structures of the insertion rod and the pressing key respectively.

Compared with the prior art, the present disclosure has the beneficial effects as follows:

1. In the present disclosure, two hook assemblies that can be adjusted horizontally are arranged, and a distance between the two U-shaped clamping openings of the hook assemblies can be adjusted, such that the present disclosure is suitable for different sizes of car seats.
2. Either of the hook assemblies of the present disclosure is provided with the hook, and the hook in the unfolded state can be used to hang items such as a garbage bag, clothes, or a bag, which enhances multifunctionality of the present disclosure.
3. The side headrest of the present disclosure is detachably connected to the rotating element, which facilitates cleaning, replacement or storage of the side headrest, bringing convenience to use.
4. The two side headrests of the present disclosure can be adjusted horizontally through the sliding rods, such that an optimal distance can be adjusted, and the user experience is effectively enhanced.
5. The side headrest of the present disclosure can be rotatably adjusted through the rotating elements to adjust the two side headrests to user-satisfactory positions and angles, and the rotating elements achieve a damping effect during rotation, thereby enhancing stability of the side headrests after angle adjustment.

DETAILED DESCRIPTIONS OF THE EMBODIMENTS

In the present disclosure, unless otherwise explicitly specified and defined, the terms “mounting”, “connecting”, “connection”, “fixing”, etc. should be understood in a broad sense, for example, they may be a fixed connection, a detachable connection, or an integrated connection; may be a mechanical connection, or an electrical connection; may be a direct connection, or an indirect connection via an intermediate medium; and may be communication inside two elements, or an interactive relation between two elements. For those of ordinary skill in the art, the specific meanings of the terms described above in the present disclosure may be interpreted according to specific circumstances.

The present disclosure will be further described below with reference to the accompanying drawings and the specific embodiments.

Example 1

Figure 1:
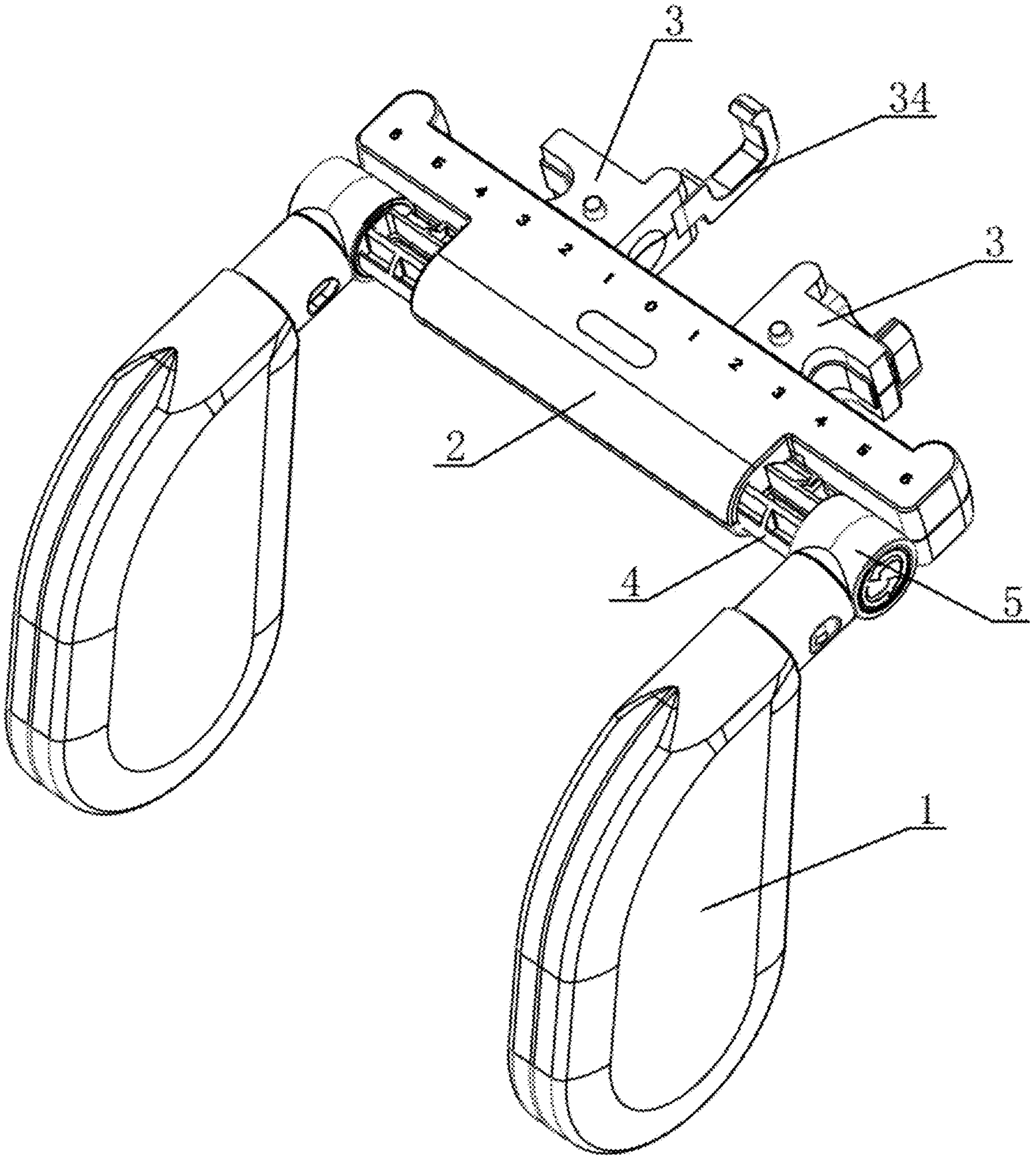
FIG. 1 is a schematic diagram of a three-dimensional structure of the present disclosure in Example 1.

As illustrated in FIG. 1, a car side headrest connection structure and side headrests, and the connection structure includes two side headrests 1, a base 2, two hook assemblies 3, two sliding rods 4, and two rotating elements 5. A housing base 31 of either of the hook assemblies 3 is provided with a U-shaped clamping opening, and the two U-shaped clamping openings of the two hook assemblies 3 are configured for clamping two insertion rods of a built-in headrest of a car seat, which facilitates installation of the present disclosure. The two hook assemblies 3 can be slidably arranged on the base 2 in a way of moving horizontally, such that a distance between the two U-shaped clamping openings can be adjusted to fit different sizes of car seats. The two sliding rods 4 are arranged at both ends of the base 2 in an inserted manner and are capable of sliding horizontally in a damped manner. One end of either of the sliding rods 4 located on an outer side of the base 2 is connected to the corresponding rotating element 5, the rotating element 5 is connected to the sliding rod 4 for damping rotation, and one of the side headrests 1 is detachably mounted on either of the rotating elements 5.

Figure 2:
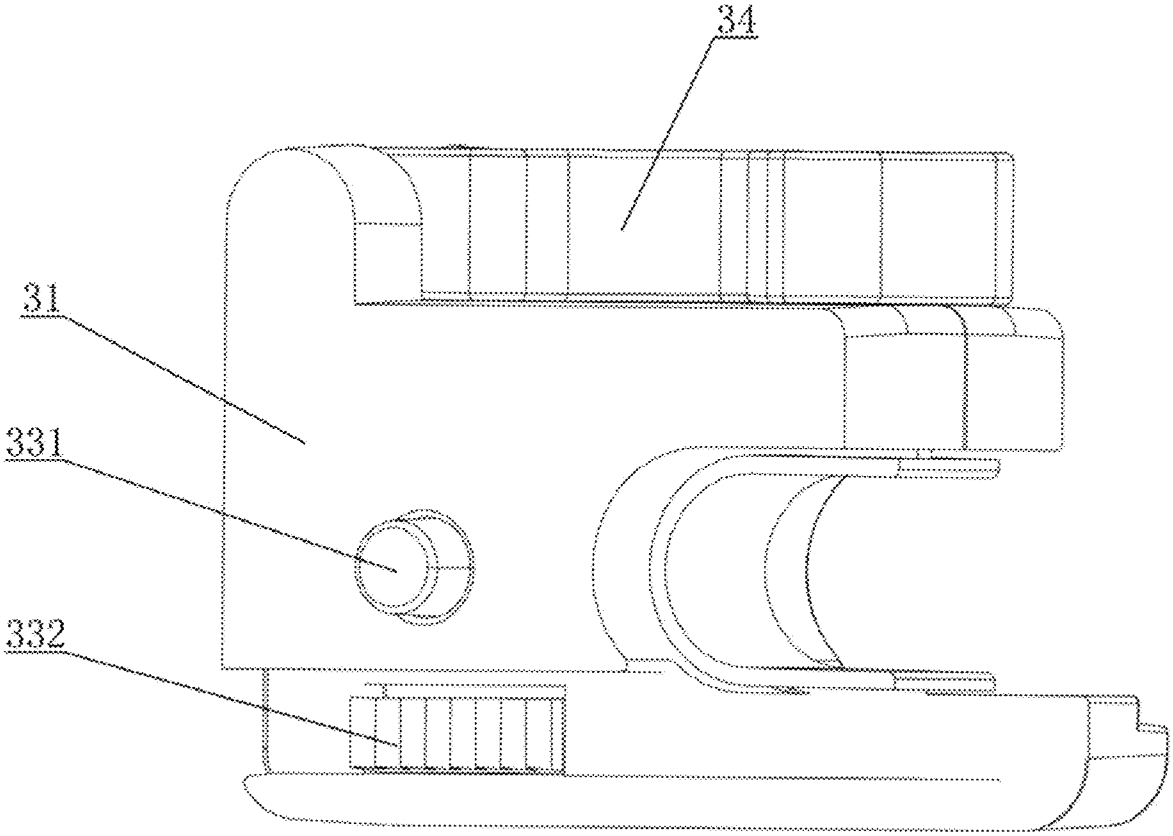
FIG. 2 is a schematic diagram of a three-dimensional structure of a hook assembly in Example 1 of the present disclosure.
Figure 3:
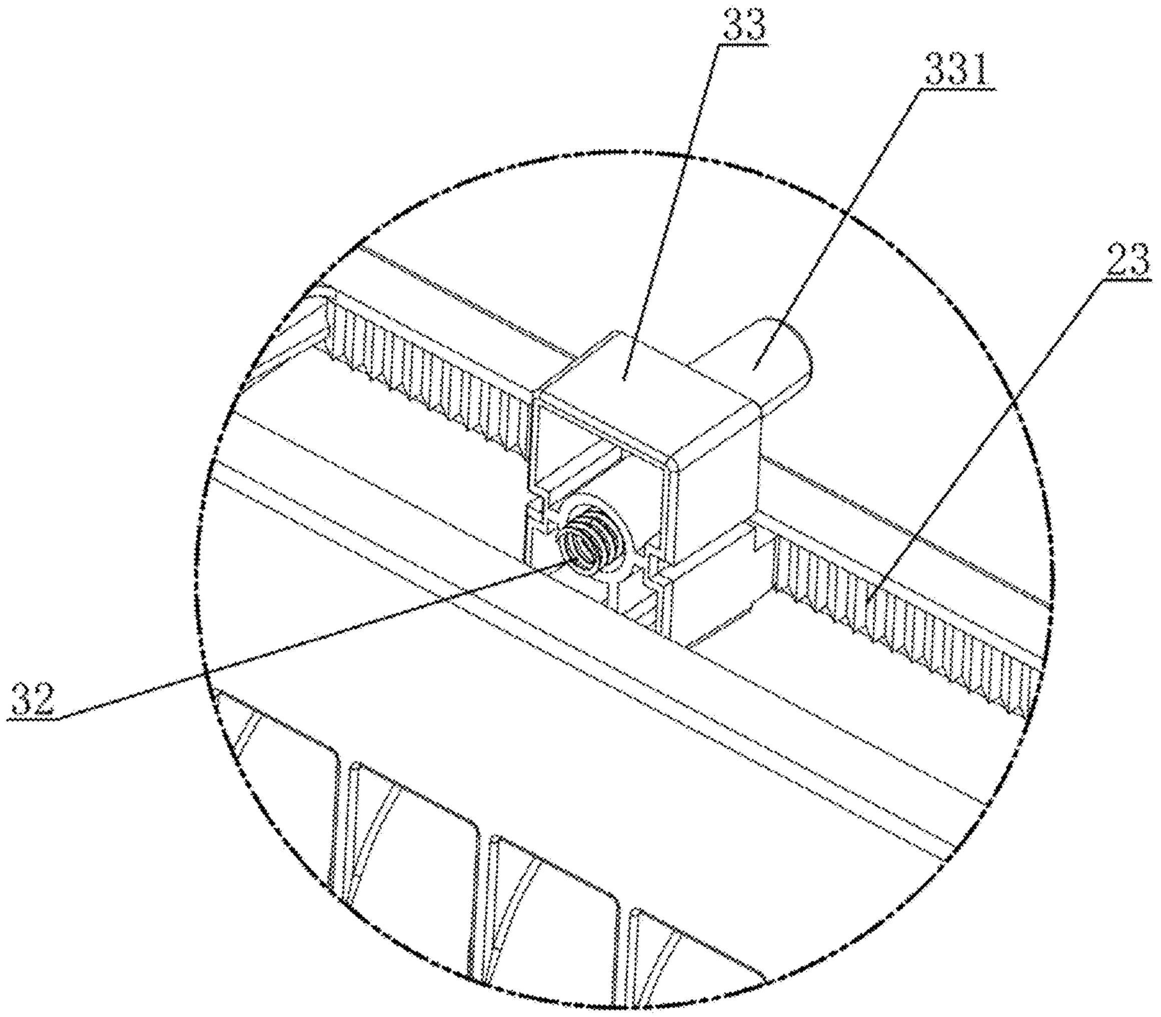
FIG. 3 is a schematic diagram of a partial structure of the present disclosure when a first tooth and a second tooth are pressed against each other under action of a first spring according to Example 1.

As illustrated in FIGS. 1, 2 and 3, either of the hook assemblies 3 includes the housing base 31, a sliding groove is formed inside the base 2 in a length direction, and the housing base 31 is slidably arranged inside the sliding groove. The housing base 31 is provided with a first spring 32 and a button body 33, where the button body 33 is provided with a button rod 331 and a first tooth 332, and the housing base 31 is provided with a first through hole for the button rod 331 to penetrate through and a second through hole for the first tooth 332 to penetrate through. A second tooth 23 that fits the first tooth 332 is formed on a sidewall of the sliding groove of the base 2, the housing base 31 is slidably arranged in the sliding groove of the base 2, and under the action of the first spring 32, the first tooth 332 presses against the second tooth 23. When the button rod 331 is pressed, the button body 33 compresses the first spring 32, such that the first tooth 332 disengages from the second tooth 23, which drives sliding of either of the hook assemblies 3. When the button rod 331 is released, the first spring 32 is reset, the first tooth 332, under the action of the first spring 32, presses against the second tooth 23, and the first tooth 332 and the second tooth 23 are meshed with each other, to fix either of the hook assemblies 3.

As illustrated in FIGS. 1 and 2, a hook 34 is hinged on the housing base 31 of either of the hook assemblies 3, and the hook 34 is capable of rotating to an unfolded position or a storage position. The hook 34 in an unfolded state can be used to hang items such as a garbage bag, clothes, or a bag.

Figure 4:
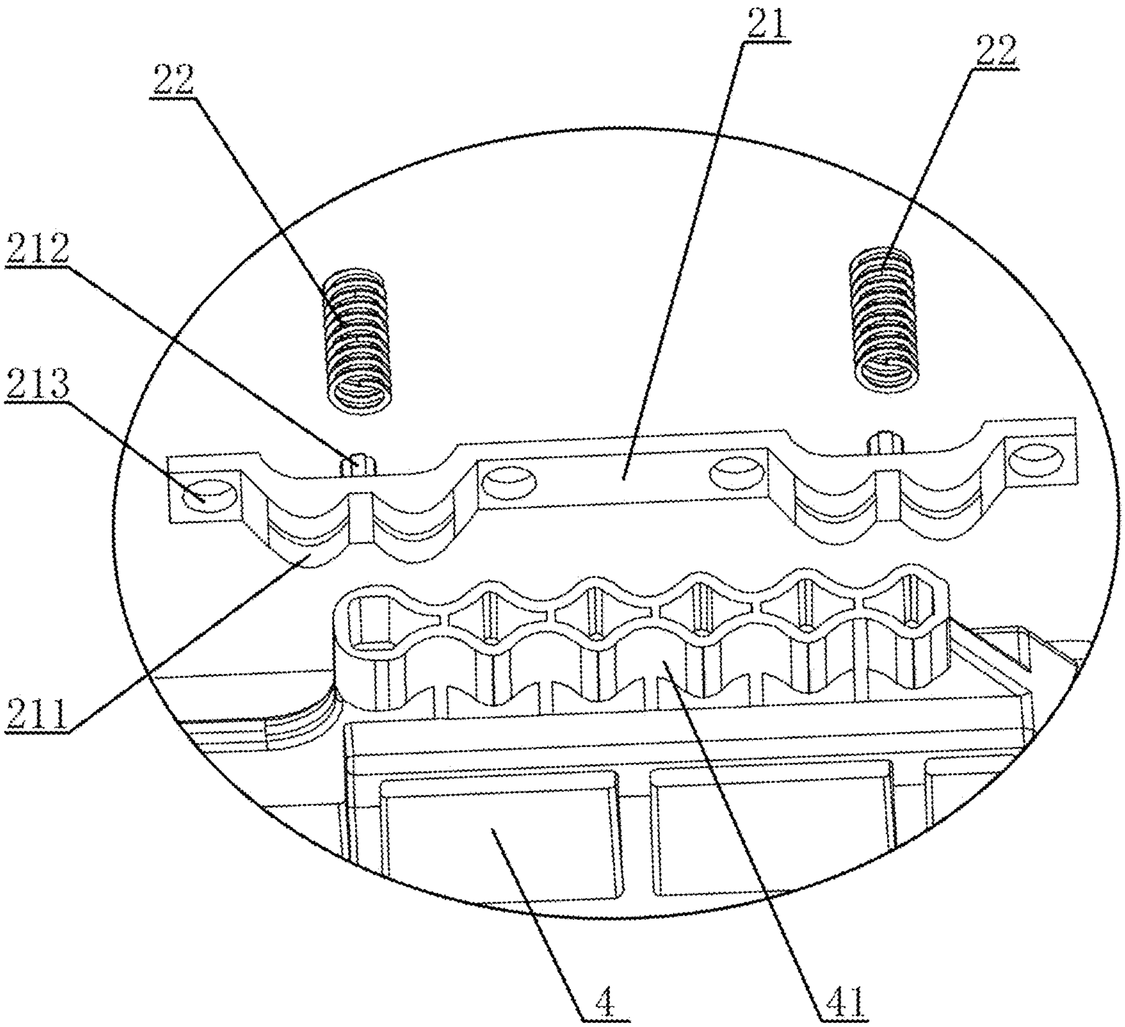
FIG. 4 is an exploded view of the present disclosure where a damping element and a second spring are connected to a first tooth pattern of a sliding rod according to Example 1.
Figure 5:
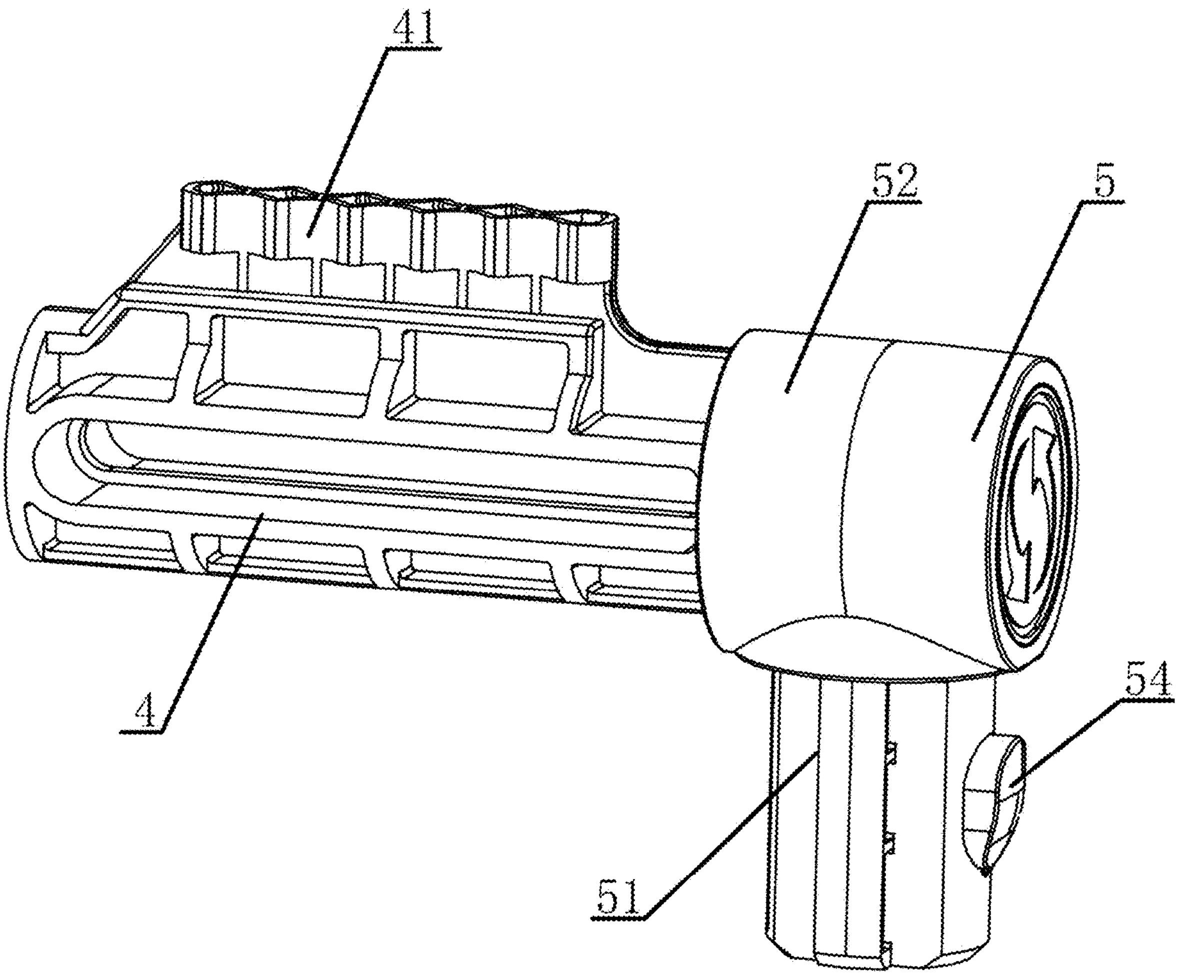
FIG. 5 is a schematic diagram of a three-dimensional structure of the present disclosure where a sliding rod and a rotating element are connected according to Example 1.

As illustrated in FIGS. 1, 4 and 5, the sliding rod 4 is provided with a first tooth pattern 41 in a length direction, and the base 2 is provided with a damping element 21 and a second spring 22, where the damping element 21 is provided with a second tooth pattern 211 that matches the first tooth pattern 41. Two protruding rod structures 212 are arranged on one side of the damping element 21 that is opposite to the second tooth pattern 211 in a length direction of the damping element 21, the number of the second springs 22 is the same as the number of the protruding rod structures 212, and the second springs 22 are sleeved on the protruding rod structures 212 in one-to-one correspondence. The base 2 is further provided with spring grooves in one-to-one correspondence with the second springs 22, and the second springs 22 are arranged in the spring grooves in one-to-one correspondence, thereby realizing stable installation of the second springs 22. A plurality of guiding holes 213 are formed in the damping element 21 in a length direction, the base 2 is provided with guiding columns that are in one-to-one correspondence with the guiding holes 213, and the guiding columns penetrate through the guiding holes 213 in one-to-one correspondence, such that the damping element 21, under the action of the second springs 22, moves back and forth in a direction of the guiding columns without deviation. When the sliding rods 4 are inserted into the base 2, the second tooth pattern 211, under the action of the second springs 22, presses against the first tooth pattern 41, to achieve a damped sliding connection between the sliding rods 4 and the base 2.

As illustrated in FIGS. 1, 5-7, a mounting groove is formed at one end of either of the sliding rods 4 located on the outer side of the base 2, and two damping tables 42 and two third springs 43 are arranged in the mounting groove. Each of the damping tables 42 includes a support 421, an arc-shaped protrusion 422 is arranged in a middle of the support 421, and a through hole for the arc-shaped protrusion 422 to penetrate through is formed in a wall of the mounting groove. A positioning rod 423 is arranged at either end of the support 421, and both ends of the corresponding third spring 43 are sleeved on the two positioning rods 423 on a same side of the two damping tables 42. Either of the rotating elements 5 is provided with a circular tube-like adapter sleeve 52, and a plurality of snap-fit grooves that are fitted with the arc-shaped protrusion 422 are uniformly formed on an inner wall of the adapter sleeve 52 along its circumference. One end of either of the sliding rods 4 located on the outer side of the base 2 is inserted into the adapter sleeve 52, and under the action of the third spring 43, the arc-shaped protrusion 422 of the damping table 42 presses against the inner wall of the adapter sleeve 52, and when the snap-fit groove is available, the arc-shaped protrusion 422 is pressed into the snap-fit groove tightly, thereby achieving a damped rotating connection between the sliding rod 4 and the rotating element 5.

Figure 6:
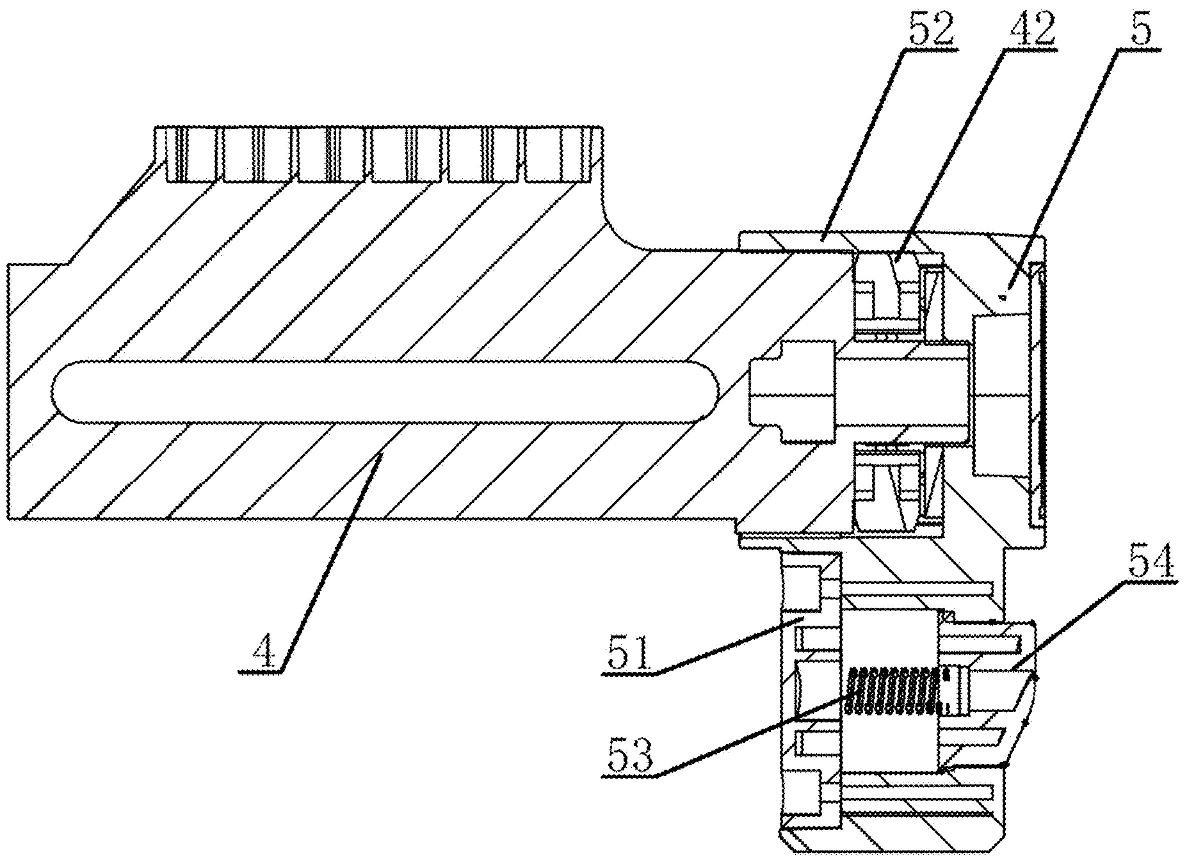
FIG. 6 is a sectional view of the present disclosure where a sliding rod and a rotating element are connected according to Example 1.
Figure 7:
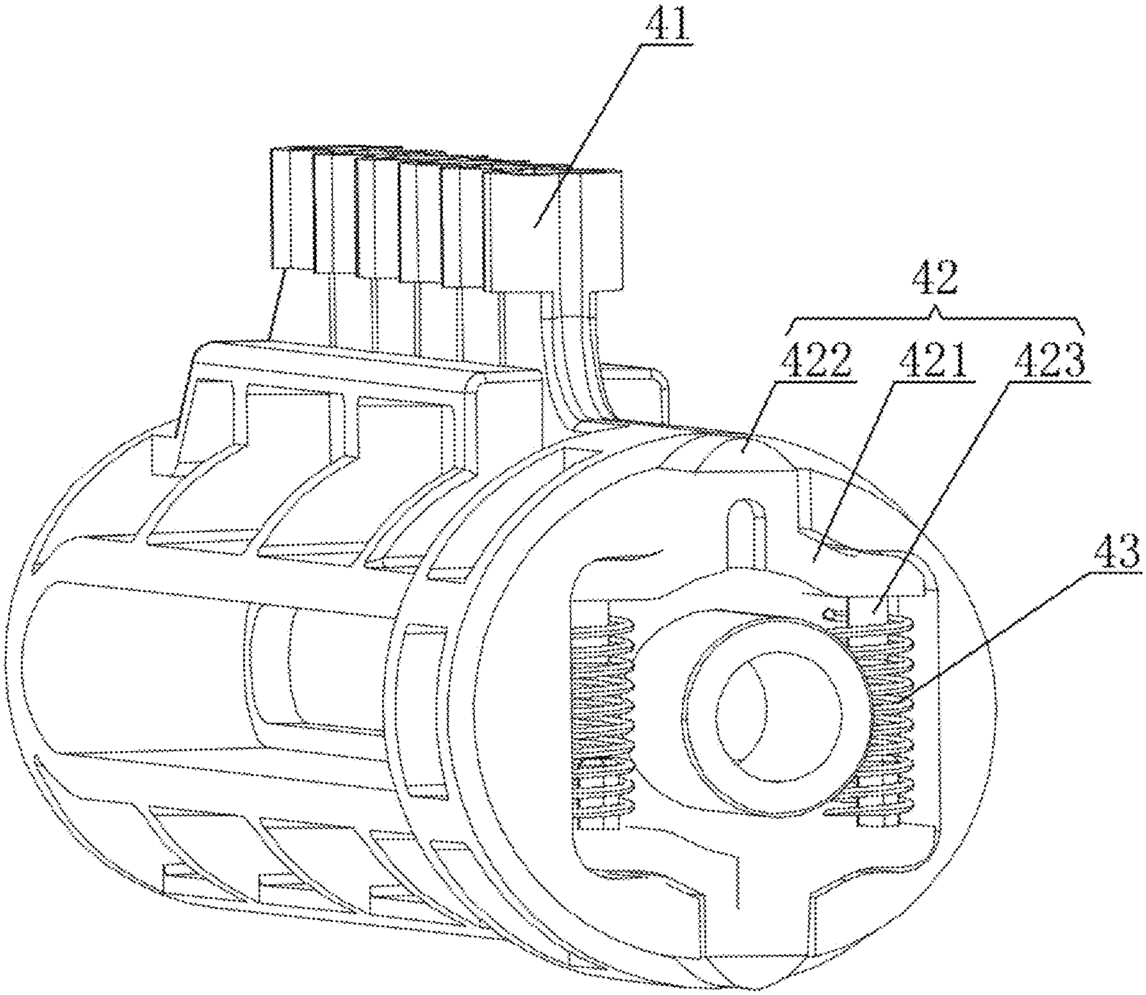
FIG. 7 is a structural schematic diagram of one end of the present disclosure where a sliding rod and a rotating element are connected according to Example 1.

As illustrated in FIGS. 1, 5 and 6, either of the rotating elements 5 is provided with an insertion rod 51, the insertion rod 51 is hollow, and the insertion rod 51 is provided with a fourth spring 53 and a pressing key 54. Both an inner wall of the insertion rod 51 and an inner wall of the pressing key 54 are provided with groove structures, and both ends of the fourth spring 53 are located in the groove structures of the insertion rod 51 and the pressing key 54 respectively. Either of the side headrests 1 is provided with a sleeve tube, the insertion rod 51 is inserted into the sleeve tube, and the sleeve tube is provided with a pressing hole; a wall of the insertion rod 51 is provided with a through hole that is communicated with the hollow structure thereof, and under the action of the fourth spring 53, an outer end of the pressing key 54 penetrates through the through hole, and is inserted into the pressing hole of the sleeve tube. In this way, a detachable connection between the side headrest 1 and the rotating element 5 is achieved, and the pressing key 54 is pressed to easily remove the side headrest 1.

Example 2

Figure 8:
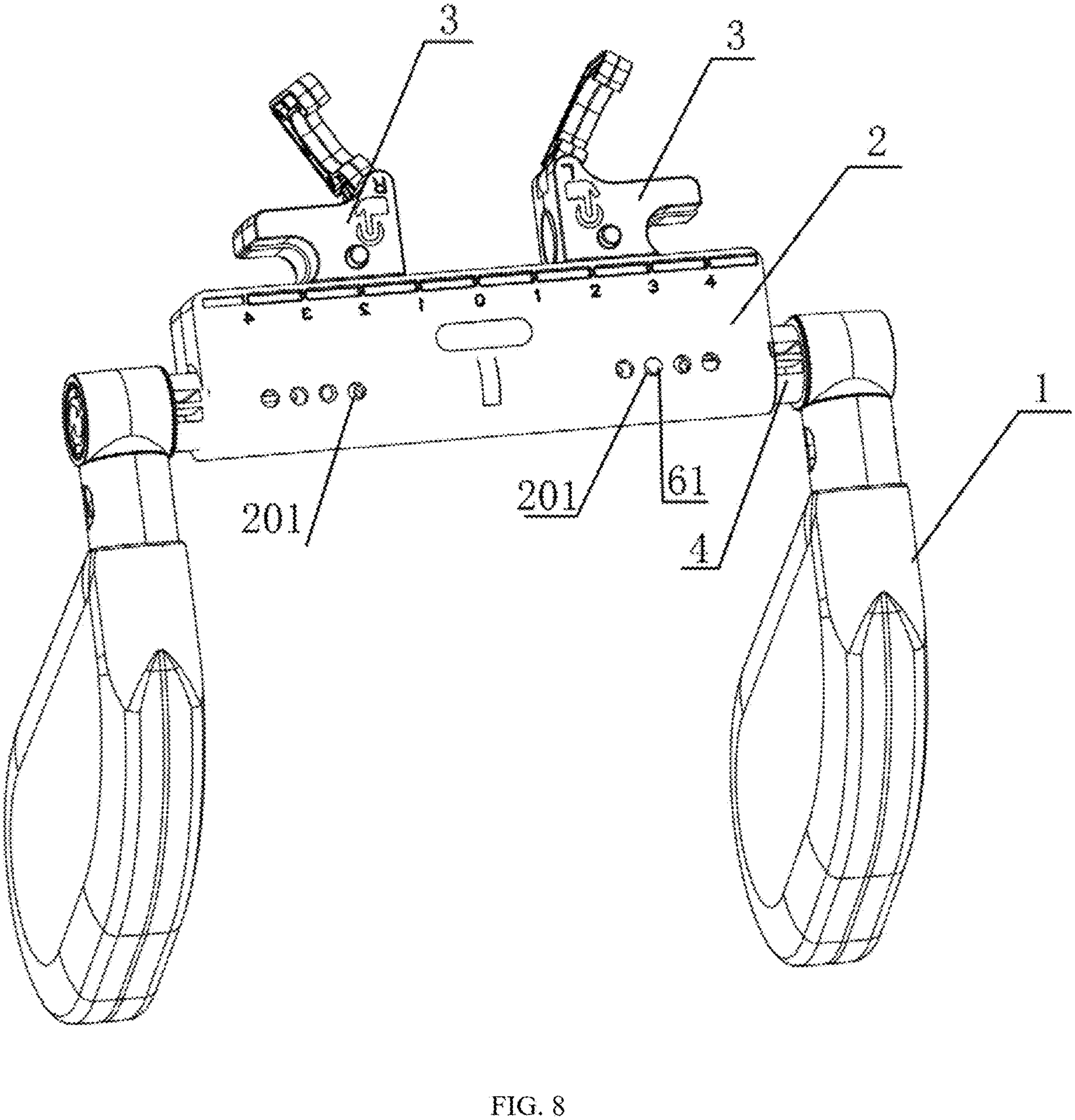
FIG. 8 is a schematic diagram I of a three-dimensional structure of the present disclosure according to Example 2.
Figure 9:
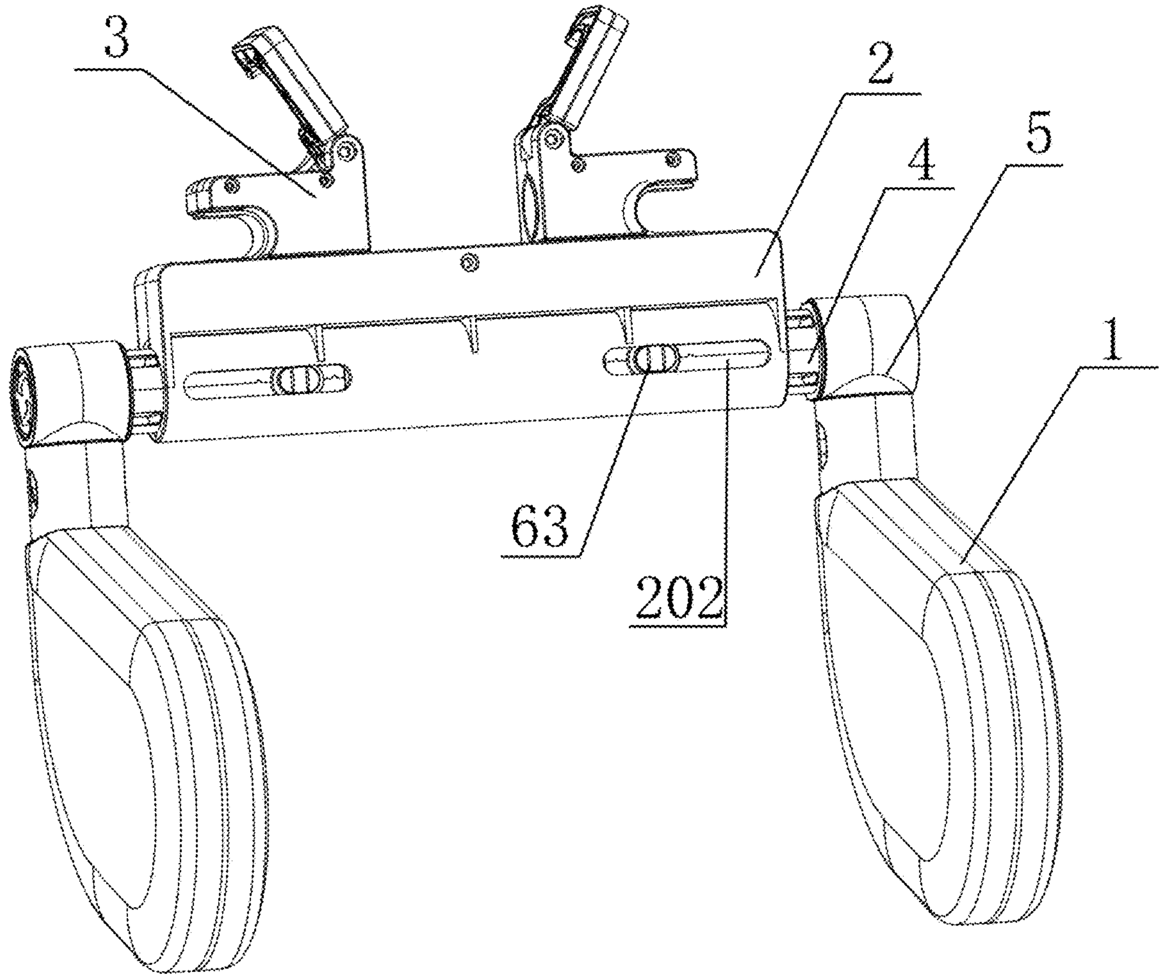
FIG. 9 is a schematic diagram II of a three-dimensional structure of the present disclosure according to Example 2.
Figure 10:
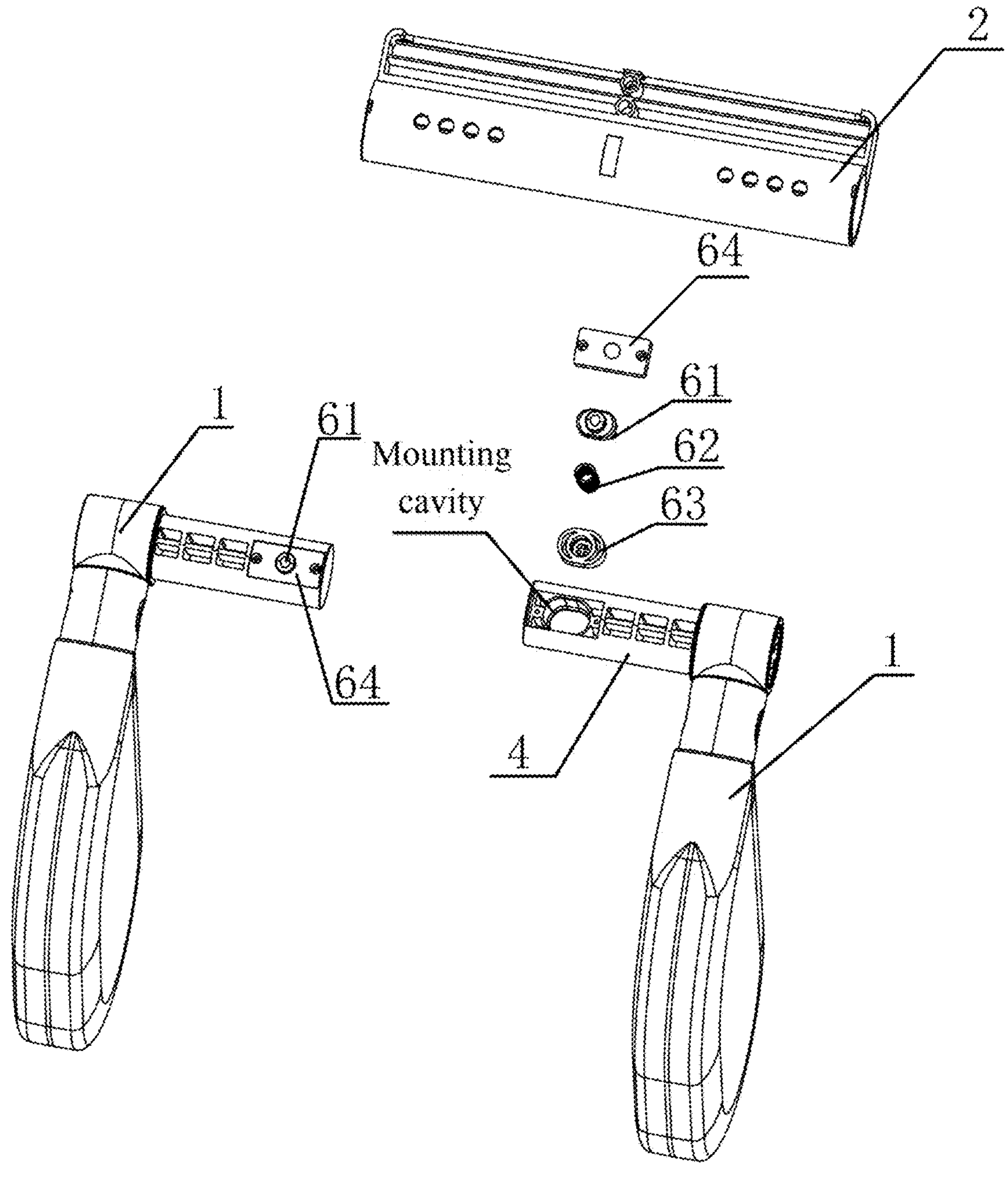
FIG. 10 is a schematic diagram of installation positions of a snap-fit table, a fifth spring and a limiting block according to Example 2 of the present disclosure.

As illustrated in FIGS. 8-10, a sliding damping structure formed by a sliding rod 4 in combination with a base 2 in this example is different from the sliding damping structure formed by the sliding rods 4 in combination with the base 2 in Example 1, thereby forming another embodiment. For example, a sliding groove is formed inside the base 2 in a length direction, a plurality of snapping holes 201 are formed horizontally on the base 2, the snapping holes 201 are circular holes, and the plurality of snapping holes 201 are arranged to be line-shaped; the base 2 opposite to the plurality of snapping holes 201 is horizontally provided with a track hole 202, the track hole 202 is a rectangular hole of a certain length, and the plurality of snapping holes 201 and the track hole 202 are connected to the sliding groove inside the base 2; the sliding rod 4 is provided with a mounting cavity, and the sliding rod 4 further includes a snap-fit table 61, a fifth spring 62, a limiting block 63, and a mounting cavity cover 64 installed inside the mounting cavity, where the snapping holes 201 are in one-to-one correspondence with the snap-fit table 61, the track hole 202 and the limiting block 63, the limiting block 63 is arranged at a bottom of the mounting cavity, and the fifth spring 62 is arranged between the snap-fit table 61 and the limiting block 63, which provides elastic support for the snap-fit table 61 and limiting block 63, such that the sliding rod 4 has a certain damping effect when sliding horizontally; the mounting cavity cover 64 is arranged above the snap-fit table 61 and is fixed onto the sliding rod 4 by means of screws, a top of the snap-fit table 61 is an arc-shaped or hemispherical structure, the top of the snap-fit table 61 penetrates through the mounting cavity cover 64 and extends into the snapping hole 201, and the limiting block 63 penetrates through the bottom of the mounting cavity and extends into the track hole 202; when the limiting block 63 slides until contact with either end of the track hole 202, it is defined as a maximum stroke or an initial position for the lateral adjustment of the sliding rod 4 on the side headrest 1; and In this way, to adjust a spacing between the two side headrests 1, a user needs to push or pull the side headrest 1, the sliding rod 4 on the side headrest 1 slides left or right inside the sliding groove of the base 2, the snap-fit table 61 disengages from the snapping hole 201, the fifth spring 62 deforms due to compressing, when the sliding rod 4 slides left or right until the snap-fit table 61 engages with the corresponding snapping hole 201, and under the action of an elastic restoring force of the fifth spring 62, a locking state of sliding the sliding rod 4 horizontally is formed, to prevent the side headrest 1 from sliding freely and affect the user experience.

To sum up, in the present disclosure, two hook assemblies 3 that can be adjusted horizontally are arranged, and a distance between the two U-shaped clamping openings of the hook assemblies 3 can be adjusted, such that the present disclosure is suitable for different sizes of car seats. Either of the hook assemblies 3 is provided with the hook 34, and the hook 34 in the unfolded state can be used to hang items such as the garbage bag, clothes, or bag, which enhances multi-functionality of the present disclosure. The side headrest 1 is detachably connected to the rotating element 5, which facilitates cleaning, replacement or storage of the side headrest 1, bringing convenience to use. The two side headrests 1 can be adjusted horizontally through the sliding rods 4, such that an optimal distance can be adjusted, and the user experience is effectively enhanced. The side headrest 1 can be rotatably adjusted through the rotating elements 5 to adjust the two side headrests 1 to user-satisfactory positions and angles, and the rotating elements 5 achieve a damping effect during rotation, thereby enhancing stability of the side headrests 1 after angle adjustment.

The above descriptions are only preferred embodiments of the present disclosure and are not intended to limit the present disclosure, and various changes and modifications may be made to the present disclosure by those skilled in the art. Any modifications, equivalent substitutions, improvements, etc. within the spirit and principles of the present disclosure are intended to fall within the scope of protection of the present disclosure.

What is claimed is:

1. A car side headrest connection structure and side headrests, comprising side headrests, further comprising a base, wherein two hook assemblies that can be moved horizontally are arranged on the base, and the hook assemblies are provided with U-shaped clamping openings; an end portion of the base is provided with sliding rods, and the sliding rods are arranged in the base in an inserted manner, and are capable of sliding horizontally in a damped manner; and one end of either of the sliding rods located on an outer side of the base is connected to a rotating element, the rotating element is connected to the sliding rod for damping rotation, and the side headrest is detachably connected to the rotating element in an inserted manner.

2. The car side headrest connection structure and side headrests according to claim 1, wherein either of the hook assemblies comprises a housing base, and the housing base is provided with a U-shaped clamping opening; the housing base is provided with a first spring and a button body, wherein the button body is provided with a button rod and a first tooth, and the housing base is provided with a first through hole for the button rod to penetrate through and a second through hole for the first tooth to penetrate through; a sliding groove is formed inside the base in a length direction, a second tooth that fits the first tooth is formed on a sidewall of the sliding groove, the housing base is slidably arranged in the sliding groove of the base, and under the action of the first spring, the first tooth presses against the second tooth; and either of the hook assemblies further comprises a hook, and the hook is hinged on the housing base.

3. The car side headrest connection structure and side headrests according to claim 1, wherein a plurality of snapping holes are formed horizontally on the base, and the base opposite to the plurality of snapping holes is horizontally provided with a track hole; and the sliding rod is provided with a mounting cavity, and the sliding rod further includes a snap-fit table, a fifth spring, a limiting block, and a mounting cavity cover installed inside the mounting cavity, the limiting block is arranged at a bottom of the mounting cavity, and the fifth spring is arranged between the snap-fit table and the limiting block, which provides elastic support for the snap-fit table; the mounting cavity cover is arranged above the snap-fit table, a top of the snap-fit table is an arc-shaped or hemispherical structure, the top of the snap-fit table penetrates through the mounting cavity cover and extends into the snapping hole, and the limiting block penetrates through the bottom of the mounting cavity and extends into the track hole.

4. The car side headrest connection structure and side headrests according to claim 1, wherein the sliding rod is provided with a first tooth pattern in a length direction, and the base is provided with a damping element and a second spring, wherein the damping element is provided with a second tooth pattern that matches the first tooth pattern, and when the sliding rods are inserted into the base, the second tooth pattern, under the action of the second springs, presses against the first tooth pattern.

5. The car side headrest connection structure and side headrests according to claim 4, wherein two protruding rod structures are arranged on one side of the damping element that is opposite to the second tooth pattern in a length direction of the damping element, the number of the second springs is the same as the number of the protruding rod structures, and the second springs are sleeved on the protruding rod structures in one-to-one correspondence.

6. The car side headrest connection structure and side headrests according to claim 5, wherein a plurality of guiding holes are formed in the damping element in a length direction, the base is provided with guiding columns that are in one-to-one correspondence with the guiding holes, and the guiding columns penetrate through the guiding holes in one-to-one correspondence; and the base is further provided with spring grooves in one-to-one correspondence with the second springs, and the second springs are arranged in the spring grooves in one-to-one correspondence.

7. The car side headrest connection structure and side headrests according to claim 1, wherein a mounting groove is formed at one end of either of the sliding rods located on the outer side of the base, damping tables and third springs are arranged in the mounting groove, either of the damping tables is provided with an arc-shaped protrusion, and a through hole for the arc-shaped protrusion to penetrate through is formed in a wall of the mounting groove; either of the rotating elements is provided with a circular tube-like adapter sleeve, and a plurality of snap-fit grooves that are fitted with the arc-shaped protrusion are uniformly formed on an inner wall of the adapter sleeve along its circumference; and one end of either of the sliding rods located on the outer side of the base is inserted into the adapter sleeve, and under the action of the third spring, the arc-shaped protrusion of the damping table presses against the inner wall of the adapter sleeve.

8. The car side headrest connection structure and side headrests according to claim 7, wherein two damping tables and two third springs are arranged in the mounting groove, each of the damping tables comprises a support, an arc-shaped protrusion is arranged in a middle of the support, a positioning rod is arranged at either end of the support, and both ends of the corresponding third spring are sleeved on the two positioning rods on a same side of the two damping tables.

9. The car side headrest connection structure and side headrests according to claim 1, wherein either of the rotating elements is provided with an insertion rod, the insertion rod is hollow, and the insertion rod is provided with a fourth spring and a pressing key; and either of the side headrests is provided with a sleeve tube, the insertion rod is inserted into the sleeve tube, and the sleeve tube is provided with a pressing hole; a wall of the insertion rod is provided with a through hole that is communicated with the hollow structure thereof, and under the action of the fourth spring, an outer end of the pressing key penetrates through the through hole, and is inserted into the pressing hole of the sleeve tube.

10. The car side headrest connection structure and side headrests according to claim 9, wherein both an inner wall of the insertion rod and an inner wall of the pressing key are provided with groove structures, and both ends of the fourth spring are located in the groove structures of the insertion rod and the pressing key respectively.

* * * * *